(12) United States Patent
Park

(10) Patent No.: US 10,110,159 B2
(45) Date of Patent: Oct. 23, 2018

(54) SOLAR CELL MODULE

(75) Inventor: Sanghwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/612,009

(22) Filed: Sep. 12, 2012

(65) Prior Publication Data

US 2013/0284238 A1    Oct. 31, 2013

(30) Foreign Application Priority Data

Apr. 25, 2012    (KR) .................... 10-2012-0043364

(51) Int. Cl.
*H02N 6/00*       (2006.01)
*H01L 31/042*     (2014.01)
*H02S 30/10*      (2014.01)
*H02S 40/34*      (2014.01)

(52) U.S. Cl.
CPC ............. *H02S 30/10* (2014.12); *H02S 40/34* (2014.12)

(58) Field of Classification Search
CPC ...... F16L 3/02; H01L 31/0424; H01L 31/042; H01L 31/02021; B32B 17/10035; B32B 17/10302; H02S 30/10
USPC ....... 136/251, 244; 248/230.7, 228.7, 231.81
See application file for complete search history.

(56) References Cited

U.S. PATENT DOCUMENTS

2005/0257453 A1    11/2005   Cinnamon
2007/0102036 A1*    5/2007   Cinnamon ............ F24J 2/5211
                                                   136/244
2007/0102038 A1*    5/2007   Kirschning ............ F24J 2/5205
                                                   136/251
2009/0242715 A1*   10/2009   Kosidlo ................ F16B 2/243
                                                   248/231.81
2010/0043862 A1*    2/2010   Croft .............................. 136/244
2011/0240084 A1    10/2011   Lai et al.
2012/0118382 A1*    5/2012   Suganuma ............. H02S 40/34
                                                   136/259

FOREIGN PATENT DOCUMENTS

| CN | 101426988 | 5/2009 |
| JP | 2000-031517 A | 1/2000 |
| JP | 2005322821 | 11/2005 |
| WO | 2011013391 A1 | 2/2011 |
| WO | 20110096043 A1 | 8/2011 |

OTHER PUBLICATIONS

"Cord Clip with Push Mount", E&T Fastener Components, publicly available at least as early as Nov. 21, 2008, accessed at <https://web.archive.org/web/20081121075645/http://www.fastenercomponents.com/products/cord-clip-with-push-mount-p-216.html> on Aug. 5, 2014.*
"Clamp—definition of clamp by The Free Dictionary", <http://www.thefreedictionary.com/clamp> accessed on Jan. 27, 2015.*
"Cord Clip with Push Mount", E&T Fastener Components, publicly available at least as early as Nov. 21, 2008, accessed at on Aug. 5, 2014. (Year: 2008).*
"Clamp—definition of clamp by The Free Dictionary", accessed on Jan. 27, 2015. (Year: 2015).*

* cited by examiner

*Primary Examiner* — Angelo Trivisonno
(74) *Attorney, Agent, or Firm* — Dentons US LLP

(57) ABSTRACT

A solar cell module according to an embodiment includes a solar cell panel including at least one solar cell; and a frame positioned at a periphery of the solar cell panel. The frame includes at least one fixing hole to receive an output cable.

14 Claims, 5 Drawing Sheets

SOLAR CELL MODULE

CROSS-REFERENCE TO RELATED APPLICATION

This application claims the priority benefit of Korean Patent Application No. 10-2012-0043364, filed on Apr. 25, 2012 in the Korean Intellectual Property Office, the disclosure of which is incorporated herein by reference.

BACKGROUND

1. Field of the Disclosure

The present disclosure relates to a solar cell module, and more particularly, to a solar cell module including an improved structure.

2. Description of the Related Art

Recently, as existing energy resources such as oil or coal are expected to be exhausted, an interest in alternative energy for replacing oil or coal is increasing. In particular, a solar cell that directly converts or transforms solar energy into electricity using a semiconductor element is gaining attention.

In a solar cell panel including a solar cell, electricity is delivered to an outside through an output cable connected to a junction box. The output cable is not fixed, or is fixed by using a tape. For this reason, during transport of the solar cell module, the transportability of the solar cell module may be decreased by the output cable, or the solar cell module may be damaged due to the output cable. In addition, when the solar cell module is connected to another solar cell module or when an output of the solar cell module is measured, a step of untying and/or arranging the output cable is additionally performed. Accordingly, the process time may increase.

SUMMARY

This disclosure is directed to a solar cell module having an enhanced safety, durability, and transportability, and being able to reduce a process time for connecting to another solar cell module and for measuring an output of the solar cell module.

A solar cell module according to an embodiment includes a solar cell panel including at least one solar cell; and a frame positioned at a periphery of the solar cell panel. The frame includes at least one fixing hole to receive an output cable.

Also, a solar cell module according to an embodiment includes a solar cell panel including at least one solar cell; a frame positioned at a periphery of the solar cell panel; and a junction box mounted on a surface of the solar cell panel and including an output cable. The output cable is fixed to the frame.

DETAILED DESCRIPTIONS

Figure 1:
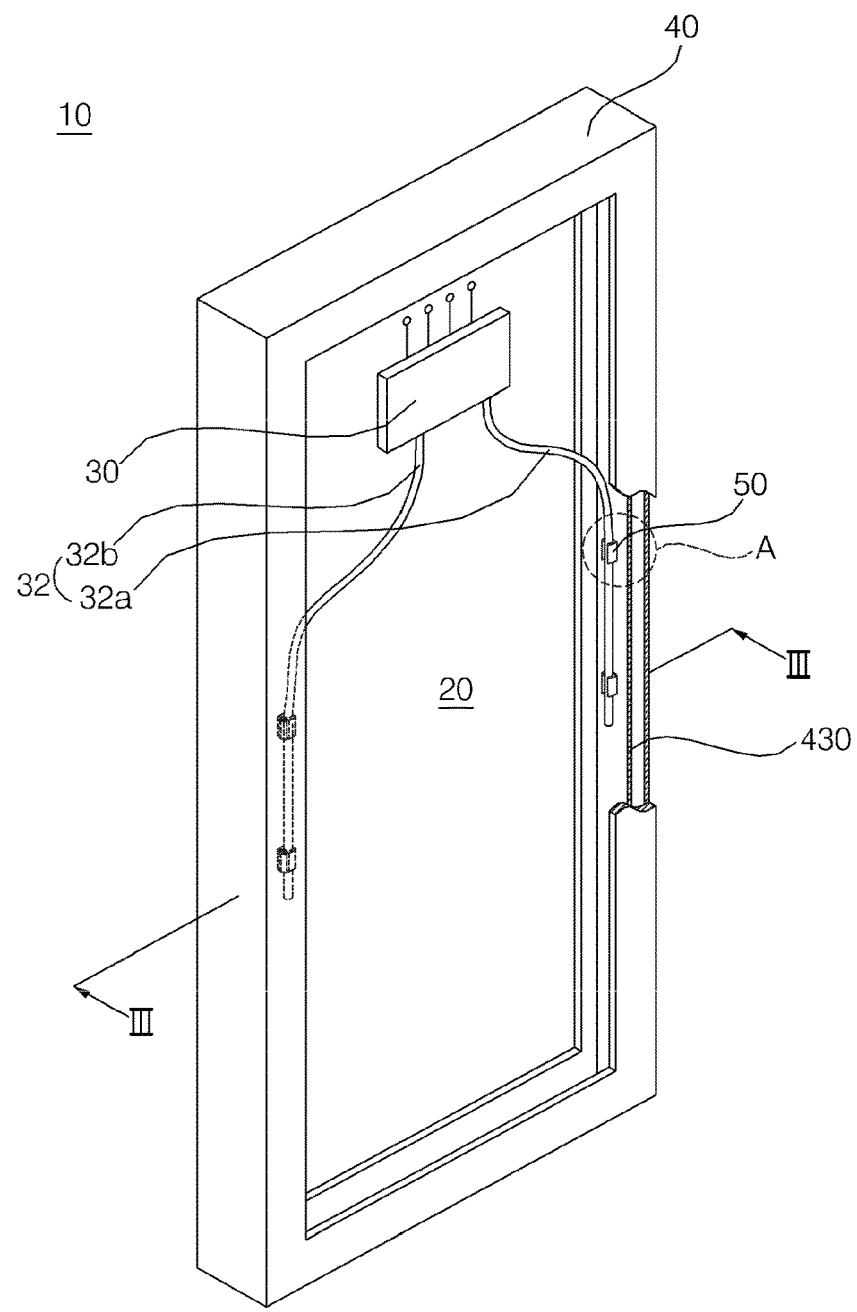
FIG. 1 is a rear perspective view illustrating a solar cell module according to an embodiment of the present invention.

Hereinafter, embodiments of the present invention will be described with reference to the accompanying drawings. However, the present invention is not limited the embodiments, and the various modifications of the embodiments are possible.

In order to clearly and concisely illustrate the embodiments of the present invention, elements not related to the embodiments of the present invention are omitted in the figures. Also, elements similar to or the same as each other may have the same reference numerals. In addition, the dimensions of layers and regions may be exaggerated or schematically illustrated, or some layers may be omitted for clarity of illustration. In addition, the dimension of each part as drawn may not reflect an actual size.

In the following description, when a layer or substrate "includes" another layer or portion, it can be understood that the layer or substrate further includes still another layer or portion. Also, when a layer or film is referred to as being "on" another layer or substrate, it can be understood that the layer of film is directly on the other layer or substrate, or intervening layers are also present. Further, when a layer or film is referred to as being "directly on" another layer or substrate, it can be understood that the layer or film is directly on the another layer or substrate, and thus, there is no intervening layer.

Hereinafter, a solar cell module according to an embodiment of the present invention will be described with reference to the accompanying drawings.

FIG. 1 is a rear perspective view illustrating a solar cell module according to an embodiment of the present invention.

Referring to FIG. 1, the solar cell module 10 according to the embodiment includes a solar cell panel 20, and a frame 40 positioned at an periphery of the solar cell panel 20. Here, a fixing hole (reference numeral 422 of FIG. 4) is formed at the frame 40, and an output cable 32 of a junction box 30 is fixed to the fixing hole 422. This will be described in more detail.

The solar cell panel 20 includes at least one solar cell. For example, the solar cell may be a silicon solar cell, a dye-sensitized solar cell, a compound semiconductor solar cell, or a tandem solar cell.

Figure 2:
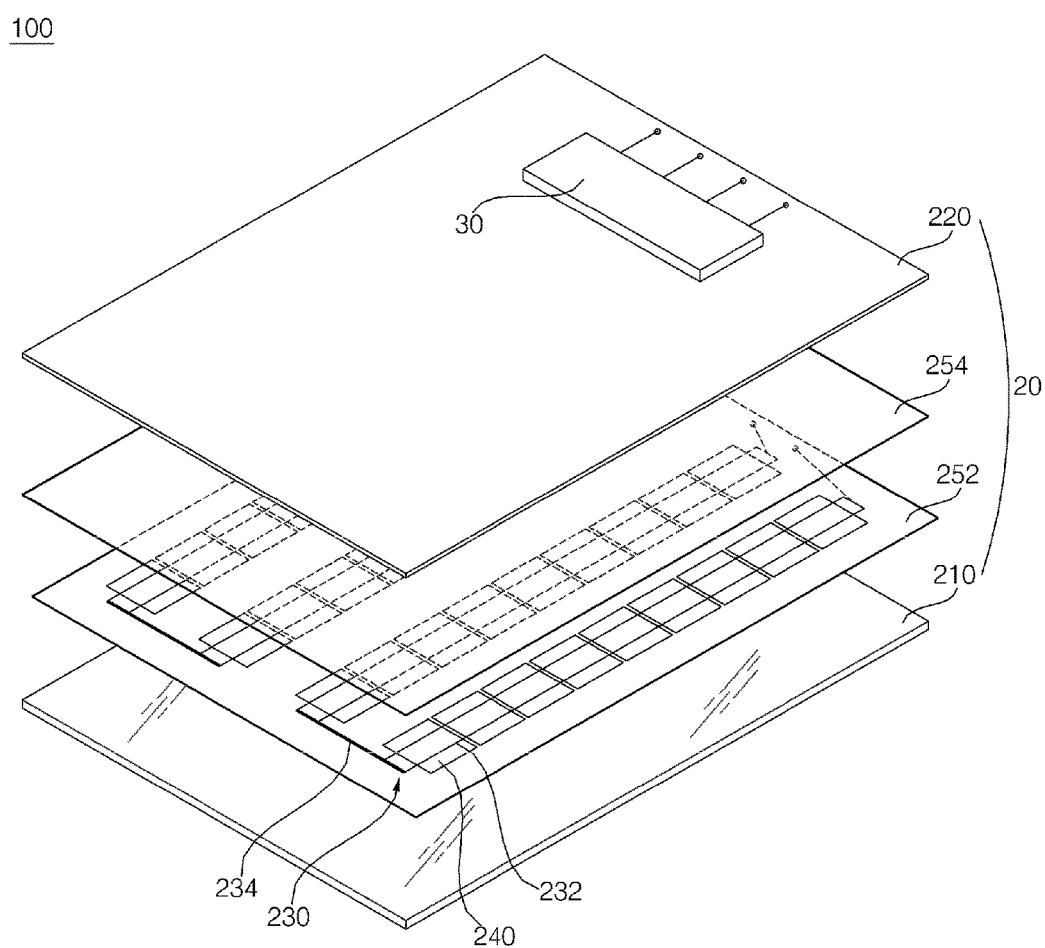
FIG. 2 is an exploded rear perspective view illustrating a solar cell panel and a junction box according to the embodiment of the present invention.

Referring to FIG. 2, the solar cell panel 20 including a silicon solar cell is described as an example. FIG. 2 is an exploded rear perspective view illustrating a solar cell panel and a junction box according to the embodiment of the present invention. In FIG. 2, an output cable 32 of the junction box 30 and a fixer 50 are not shown.

Referring to FIG. 2, the solar cell panel 20 according to the embodiment may include one or more solar cell strings 230 between the front substrate 210 and the rear substrate 220. The solar cell string 230 includes a plurality of solar cells 240 electrically connected to each other in series, in parallel, or in series-and-parallel arrangement. The solar cell panel 20 may further include a first sealing film 252 disposed between the solar cell string 230 and the front substrate 210, and a second sealing film 254 disposed between the solar cell string 230 and the rear substrate 220.

The front substrate 210 may be made of tempered glass for protecting the solar cells 240 from external shock and allowing solar light to pass. Here, the front substrate 210, in order to reduce or prevent solar light from being reflected and to increase transmission of solar light, may be made of low iron tempered glass containing a low iron content. The rear substrate 220 is a layer for protecting the other side of the solar cells 240, and for water-proofing, insulating, and blocking of ultraviolet rays. The rear substrate 220 may have a TPT (Tedlar/PET/Tedlar) type. However, the embodiments of the invention are not limited thereto. Thus, the rear substrate 220 may be a material having high reflectivity in order to reflect solar light entering the front substrate 210 back to the solar cells 240. However, the embodiments of the invention are not limited thereto. Thus, the rear substrate 220 may include a transparent material for allowing solar light to pass in order to realize a bi-facial solar cell panel.

Each of the solar cells 240 may include a silicon substrate of a first conductive type, a second conductive type semiconductor layer, an anti-reflection film, a front electrode, and a rear electrode. The second conductive type semiconductor layer is formed on the silicon substrate and has a conductive type opposite to the first conductive type. The anti-reflection film is formed on the second conductive type semiconductor layer, and includes at least one opening for exposing a part of the second conductive type semiconductor layer. The front electrode is in contact with the part of the second conductive type semiconductor layer that is exposed through the at least one opening of the anti-reflection film. The rear electrode is formed on the rear side of the silicon substrate. However, embodiments of the invention are not limited thereto and the solar cells 240 may be different types of solar cells.

The plurality of solar cells 240 are electrically connected by a ribbon or ribbons 232 to form a solar cell string 230. When a plurality of solar cell strings 230 exist, the plurality of solar cell strings are electrically connected by a bus ribbon or bus ribbons 234. However, the embodiments of the invention are not limited thereto, and only one solar cell 240 may be included depending on a type of the solar cell 240.

The first sealing film 252 and the second sealing film 254 block moisture and/or oxygen that would adversely affect the solar cells 240. The first and second sealing films 252 and 254 may include one or more of various materials. For example, the first sealing film 252 and the second sealing film 254 may be an ethylene-vinyl acetate copolymer resin (EVA) film. However, the embodiments of the invention are not limited thereto, and various other materials may be used for the first and second sealing films 252 and 254.

The junction box 30 may be positioned on the rear substrate 220 of the solar cell panel 20. The junction box 30 may include circuit elements, such as, a capacitor for charging or discharging the electric energy generated from the solar cells 240 and a diode for preventing reversal of current. A coating for preventing water penetration may be formed on an inside of the junction box 30 to protect the circuit elements.

When the junction box 30 operates, a lot of heat may be generated from the diode. The heat may reduce an efficiency of the solar cell 240 positioned adjacent to the junction box 30. Accordingly, heat radiation elements (not shown) may be arranged between the solar cell panel 20 and the junction box 30. Here, in order to effectively disperse the heat generated from the junction box 30, the heat radiation elements may have areas larger than that of the junction box 30. For example, the heat radiation elements are entirely formed on the rear surface of the solar cell panel 20. The heat radiation elements are made of metal having high thermal conductivity, such as, gold (Au), silver (Ag), copper (Cu), aluminum (Al), tungsten (W), and so on.

The junction box 30 includes the output cable (or the output cables) 32 in order to deliver the electric energy generated from the solar cell 240 to the outside, or to be connected to another solar cell module. Referring to FIG. 1 again, in the embodiment, the output cable 32 is fixed to the frame 40 by using the fixer 50, and this will be described later in more detail.

Figure 3:
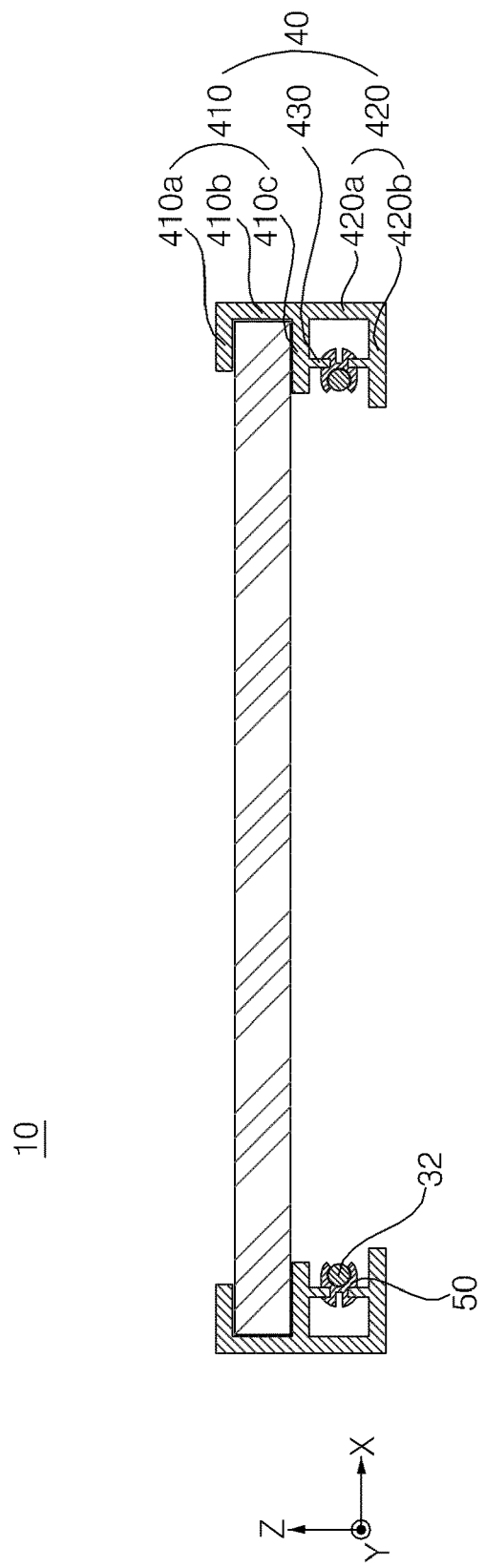
FIG. 3 is a cross-sectional view of the solar cell module, taken along a line of III-III of FIG. 1.

The frame 40 for fixing and combining the solar cell panel 20 is included so as to stably fix the solar cell panel 20 including various layers as in the above. The frame 40 will be described in more detail with reference to FIG. 3. FIG. 3 is a cross-sectional view of the solar cell module, taken along a line of FIG. 1.

In the embodiment, the frame 40 may include a first portion 410, a second portion 420, and a third portion 430. At least apart of the solar cell panel is inserted into the first portion 410. The second portion 420 extends from the first portion 410 to the outside. The third portion 430 is positioned between the first portion 410 and the second portion 420.

More specifically, the first portion 410 includes a portion 410a that is positioned on the light-incident surface of the solar cell panel 20, a portion 410b that is positioned on a side surface of the solar cell panel 20, and a portion 410c that is positioned on the rear surface of the solar cell panel 20. The first, second, third portions 410a, 410b and 410c are connected to each other so that the at least a part of the solar cell panel 20 can be inserted into the first portion 410. For example, the first portion 410 may have a "U" shape. In the embodiment, the first portion 410 entirely surrounds the peripheries of the solar cell panel 20. However, the embodiments of the invention are not limited thereto. Accordingly, various modifications (for example, the first portion 410 surrounds a part of the peripheries of the solar cell panel 20) are possible.

The second portion 420 includes a vertical part 420a perpendicular to the solar cell panel 20 and a parallel part 420b parallel to the solar cell panel 20. For example, the second portion 420 may have a "L" shape. The third portion 430 is spaced from the vertical part 420 by a predetermined distance and is parallel to the vertical part 420a between the first portion 410 and the parallel part 420b. The third portion 430 includes the fixing hole (reference numeral 422 of FIG. 4) where the fixer 50 is fixed.

Figure 4:
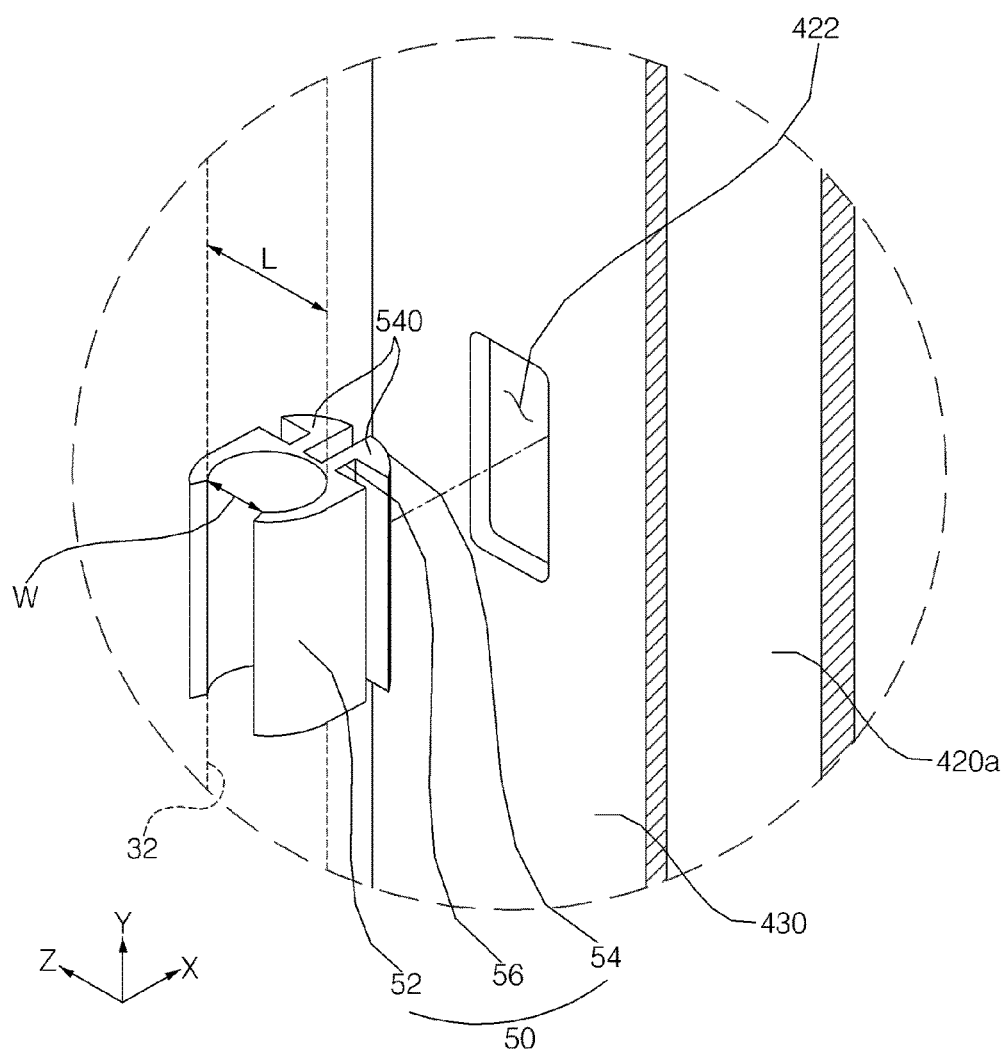
FIG. 4 is an enlarged exploded perspective of portion A of FIG. 1.
Figure 5:
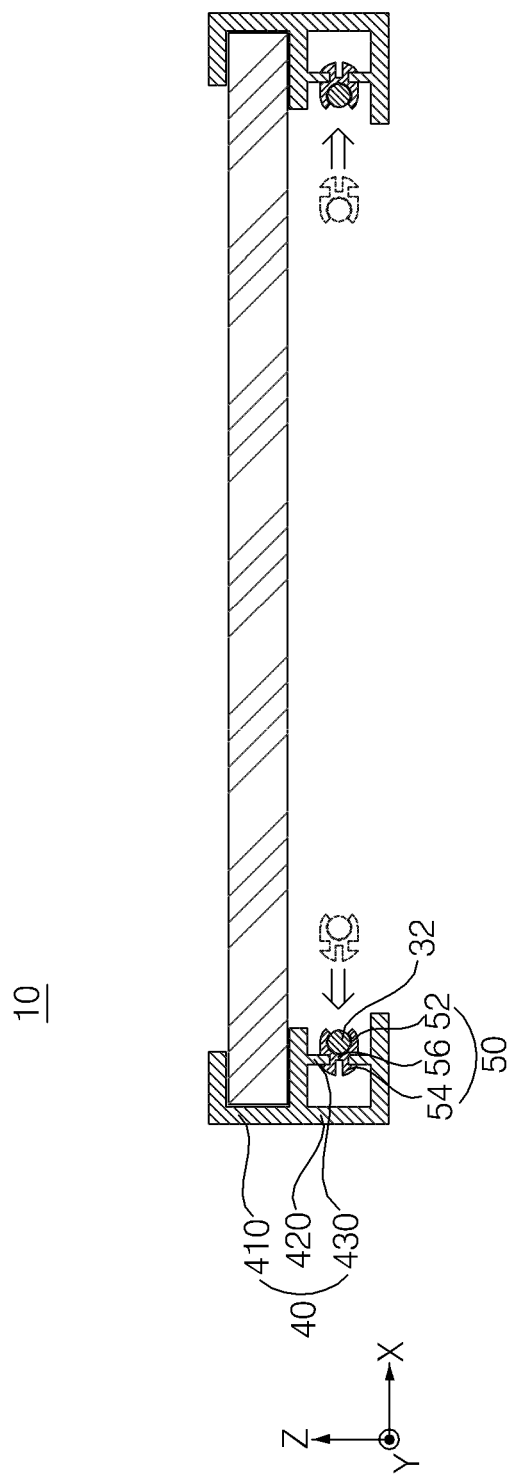
FIG. 5 is a cross-sectional view illustrating a method of fixing an output cable to a frame by using a fixer according to an embodiment of the present invention.

As shown in the above, the output cable 32 of the junction box 30 is fixed to the frame 40 by using the fixer 50. The structure of the fixer 50 and the method for fixing the fixer 50 to the frame 40 will be described in more detail with reference to FIGS. 4 and 5. FIG. 4 is an enlarged exploded perspective of portion A of FIG. 1, and FIG. 5 is a cross-sectional view illustrating a method for fixing an output cable to a frame by using a fixer according to the embodiment of the present invention. FIG. 5 shows an xz plane of FIG. 4.

Referring to FIGS. 4 and 5, the fixer 50 according to the embodiment may include a cable-clamping part 52, a hooking part 54, and a connecting part 56. In the cable-clamping part 52, the output cable 32 is fixed. The hooking part 54 is inserted into the fixing hole 422, and includes a hooking protrusion so that the hooking part 54 does not pull out of the fixing hole 422 due to the hooking protrusion after inserting the hooking part 54. The connecting part 56 connects the cable-clamping part 52 and the hooking part 56. A part of a fixer 50 is inserted to the fixing hole 422 to fix the output cable 32 to the frame 40 (more specifically, the third portion 430), and this will be described in more detail later.

The cable-clamping part 52 surrounds a part of the output cable 32 and includes an opening at one side. An inner surface of the cable-clamping part 52 may have a shape of a circular arc to correspond to an outer surface of the output cable 32. In addition, the cable-clamping part 52 may extend along a longitudinal direction of the output cable 32. Due to the shape of the cable-clamping part 52, the cable-clamping part 52 can fix the output cable 32 strongly and stably.

The opening of the cable-clamping part 52 allows the output cable 32 to be inserted into the cable-clamping part 52. The opening extends along the longitudinal direction of the output cable 32 so that the output cable 32 can pass through the opening of the cable-clamping part 52.

Here, the opening of the cable-clamping part 52 may have a width W smaller than a diameter L of the output cable 32. Then, the output cable 32 passes through the opening of the cable-clamping part 52 by applying pressure to the output cable 32 by the cable-clamping 52, and thus, the output cable 32 is fixed to the cable-clamping part 52. That is, the output cable 32 is fixed to the cable-clamping part 52 by the forced-inserting the output cable 32 into the cable-clamping part 52. Likewise, in the embodiment, the output cable 32 is stably fixed in the cable-clamping part 52 by a simple method.

The hooking part 54 may include a plurality of hooking portions 540 extending from the connecting part 56 while interposing a space therebetween. Areas of the plurality of hooking portions 540 may gradually decrease as a distance from the connecting part 56 increases. More particularly, the outer portions of the plurality of hooking portions 540 may gradually decrease as a distance from the connecting part 56 increases. Here, areas of portions of the cable-clamping part 52 and the hooking part 54 adjacent to the connecting part 56 are larger than an area of the fixing hole 422, and an area of the connecting part 56 is smaller than the area of the fixing hole 422. Accordingly, the plurality of hooking portions 540 can pass through the fixing hole 422, and can act as hooking protrusions after passing the fixing hole 422.

The fixer 50 may be formed of one of more of various materials. For example, the fixer 50 includes a resin, where the fixer 50 can be easily manufactured and the resiliency of the fixer 50 when the fixer is inserted into the fixing hole 422 prevents the fixer 50 from breaking.

A method for fixing the output cable 32 to the frame 40 by using the fixer 50 will be described. As shown in a dotted line of FIG. 5, the output cable 32 is inserted into the cable-clamping part 52 of the fixer 50, and the fixer 50 is positioned in front of the third portion 430 of the frame 40. After that, the hooking part 54 of the fixer 50 is inserted into the fixing hole 422 by applying pressure. Then, a part of the hooking part 54 passes through the fixing hole 422. That is, the plurality of hooking portions 540 (see FIG. 4) of the hooking part 54 approaches the fixing hole 422 and easily pass through the fixing hole 422. Then, as shown in a solid line of FIG. 5, the connecting part 56 having relatively small area is positioned in the fixing hole 422, and the plurality of hooking portions 540 of the hooking part 54 fall apart from each other and the portions adjacent to the connecting part 56 act as the hooking protrusions. Thus, the fixer 50 does not pull out of the fixing hole 422.

In the embodiment, the fixer 50 clamping the output cable 32 is fixed to the frame 40, and thus, the output cable 32 is prevented from moving unnecessarily. Therefore, crack generation or decrease of transportability due to the unnecessary movements of the output cable 32 can be prevented. Accordingly, an enhanced safety, durability, and transportability of the solar cell module 10 can be enhanced.

Also, in the frame 40, the third portion 430 is mounted at a space between the first portion 410 and the second portion 420, and the fixing hole 422 is formed on the third portion 430. Thus, the output cable 32 and the fixer 50 for fixing the output cable 32 are not exposed to the outside. Thus, when a plurality of solar cell modules 10 are mounted together, a problem that a gap exists between the plurality of solar cell modules 10 can be prevented.

In addition, the cable-clamping part 52 of the fixer 50 can fix the output cable 32 easily and stably. Also, since the hooking part 54 of the fixer 50 includes a plurality of hooking parts 540, the hooking part 54 can pass the fixing hole 422 easily. In this case, when the outer portions of the plurality of hooking parts 540 gradually decreases and are symmetrical to each other, the hooking part 54 can pass the fixing hole 422 more easily.

Referring to FIG. 1 again, the output cable 32 includes a first cable 32a and a second cable 32b having a (+) terminal and a (−) terminal. Here, the first cable 32a is fixed to one side (a right side of the frame 40 in FIG. 1), and the second cable 32b is fixed to a second side (a left side of the frame 40 in FIG. 1) opposite to the first side. Then, when the plurality of solar cell modules 10 are connected, they can be easily connected. Also, the time for measuring the output can be minimized.

On the other hand, in the prior art, two output cables are fixed together. Thus, the electrical connection with neighboring solar cell module is not easy. Also, when the output is measured, two output cables are untied, the output is measured, and then two output cables are fixed together again. Thus, the process is complicated and the process time is long.

In the embodiment, one or more fixers 50 correspond to each of the first and second cables 32a and 32b. As shown in FIG. 1, when the plurality of fixers 50 correspond to each of the first and second cables 32a and 32b, the first and second cables 32a and 32b can be fixed to the frame 40 more stably. The fixing hole 422 may be formed at the long sides among the long sides and the short sides of the frame 40. Here, the fixer 50 is fixed to the long sides of the frame 40. As such, because the fixing hole 422 and the fixer 50 are formed or fixed to the long side having relatively large areas, and the fixer 50 can be easily inserted through the fixing hole 422.

In the embodiment, the fixer 50 clamping the output cable 32 is fixed to the frame 40, and thus, the output cable 32 is prevented from moving unnecessarily. Therefore, crack generation or decrease of transportability due to the unnecessary movements of the output cable 32 can be prevented. Accordingly, an enhanced safety, durability, and transportability of the solar cell module 10 can be enhanced.

Also, in the frame 40, the third portion 430 is mounted at a space between the first portion 410 and the second portion 420, and the fixing hole 422 is formed on the third portion 430. Thus, the output cable 32 and the fixer 50 for fixing the output cable 32 are not exposed to the outside. Thus, when a plurality of solar cell modules 10 are mounted together, a problem that a gap exists between the plurality of solar cell modules 10 can be prevented.

In addition, two output cables 32 are fixed to different sides, and therefore, the plurality of solar cell modules 10 can be easily connected and the time for measuring the output can be minimized.

Certain embodiments of the invention have been described. However, the invention is not limited to the specific embodiments described above; and various modifications of the embodiments are possible by those skilled in the art to which the invention belongs without leaving the scope defined by the appended claims.

What is claimed is:

1. A solar cell module comprising:
a solar cell panel comprising a solar cell;
a frame at a periphery of the solar cell panel, comprising:
   a fixing hole;
   a first portion covering a side of the solar cell panel and portions of front and back of the solar cell panel including a side portion (410b) covering entire of side of the solar cell panel, a front portion (410a) covering a portion of the front of the solar cell panel and a back portion (410c) covering a portion of the back of the solar cell panel;
   a second portion extending from the side portion (410b) in a direction away from the rear of the solar cell panel, including a vertical part (420a) perpendicular to the solar cell panel and
   a parallel part (420b) spaced apart from the solar cell panel and parallel to the solar cell panel; and
   a third portion including a portion connecting the back portion (410c) and the parallel part (420b) of the second portion to be parallel to the vertical part of the second portion, wherein the fixing hole is at the portion of the third portion connecting the first portion and the parallel part of the second portion,
a fixer physically clamping an output cable without an electrical connection in the fixing hole so that the fixer is fixed to the frame, including:
   a cable-clamping part where the output cable is clamped; and
   a hooking protrusion inserted in the fixing hole to fix the fixer to the fixing hole,
   wherein the fixer is made of a resin having resiliency,
   wherein the side portion (410b) is directly in contact with the entire side surface of the solar cell panel, and
   a region corresponding to the surface of the third portion is apart from the solar cell panel and does not overlap with the solar cell panel.

2. The solar cell module according to claim 1, wherein the solar cell module further comprises a junction box mounted on a surface of the solar cell panel and that includes the output cable.

3. The solar cell module according to claim 1, wherein the frame has a long side and a short side, and
wherein the fixing hole is at the long side.

4. The solar cell module according to claim 2, wherein the fixer further comprises:
a connecting part connecting the cable-clamping part and the hooking part.

5. The solar cell module according to claim 4, wherein areas of the cable-clamping part and the hooking part adjacent to the connecting part are larger than an area of the fixing hole, and
wherein an area of the connecting part is smaller than the area of the fixing hole.

6. The solar cell module according to claim 4, wherein the cable-clamping part surrounds a portion of the output cable and comprises an opening at one side.

7. The solar cell module according to claim 6, wherein the opening of the cable-clamping part has a width smaller than a diameter of the output cable.

8. The solar cell module according to claim 7, wherein the cable-clamping part extends along a longitudinal direction of the output cable, and
wherein the opening extends along the longitudinal direction of the output cable.

9. The solar cell module according to claim 4, wherein the output cable is fixed to the cable-clamping part by forced-inserting the output cable into the cable-clamping part.

10. The solar cell module according to claim 2, wherein the output cable comprises a first cable fixed to a first side of the frame and a second cable fixed to a second side of the frame opposing to the first side.

11. The solar cell module according to claim 2, wherein the output cable comprises a plurality of output cables, and the fixer comprises a plurality of fixers corresponding to each of the plurality of output cables.

12. A solar cell module comprising:
a solar cell panel comprising a solar cell;
a frame at a periphery of the solar cell panel; and
a junction box mounted on a surface of the solar cell panel and comprising an output cable,
wherein the output cable is fixed to the frame,
wherein the frame comprises:
   a fixing hole;
   a fixer physically clamping the output cable without an electrical connection;
   a first portion covering of a side of the solar cell panel and portions of front and back of the solar cell panel including a side portion (410b) covering entire of side of the solar cell panel, a front portion (410a) covering a portion of the front of the solar cell panel and a back portion (410c) covering a portion of the back of the solar cell panel;
   a second portion extending from the side portion (410b) in a direction away from the rear of the solar cell panel, including a vertical part perpendicular to the solar cell panel and a parallel part (420b) spaced apart from the solar cell panel and parallel to the solar cell panel; and
   a third portion including a portion connecting the back portion and the parallel part of the second portion to be parallel to the vertical part of the second portion,
   wherein the fixing hole is at the portion of the third portion connecting the first portion and the parallel part of the second portion,
wherein a portion of the fixer is in the fixing hole so that the fixer is fixed to the frame,
wherein the frame has a long side, a first short side, and a second short side opposite to the first short side,
wherein the junction box is closer to the first short side than the second short side,
wherein a distance between the fixing hole and the first short side is longer than a distance between the junction box and the first short side, and
wherein the fixing hole is at the long side,
   wherein the side portion (410b) is directly in contact with the entire side surface of the solar cell panel, and
   a region corresponding to the surface of the third portion is apart from the solar cell panel and does not overlap with the solar cell panel.

13. The solar cell module according to claim 12, wherein the long side includes a first long side and a second long side opposite to the first long side, and
the output cable comprises a first cable fixed to the first long side and a second cable fixed to the second long side.

14. The solar cell module according to claim 12, wherein the fixer comprises:
  a cable-clamping part clamping the output cable;
  a hooking part comprising a hooking protrusion, wherein the hooking part is inserted into the fixing hole and does not pull out of the fixing hole due to the hooking protrusion after inserting the hooking part; and
  a connecting part connecting the cable-clamping part and the hooking part.

* * * * *